Figure 1:
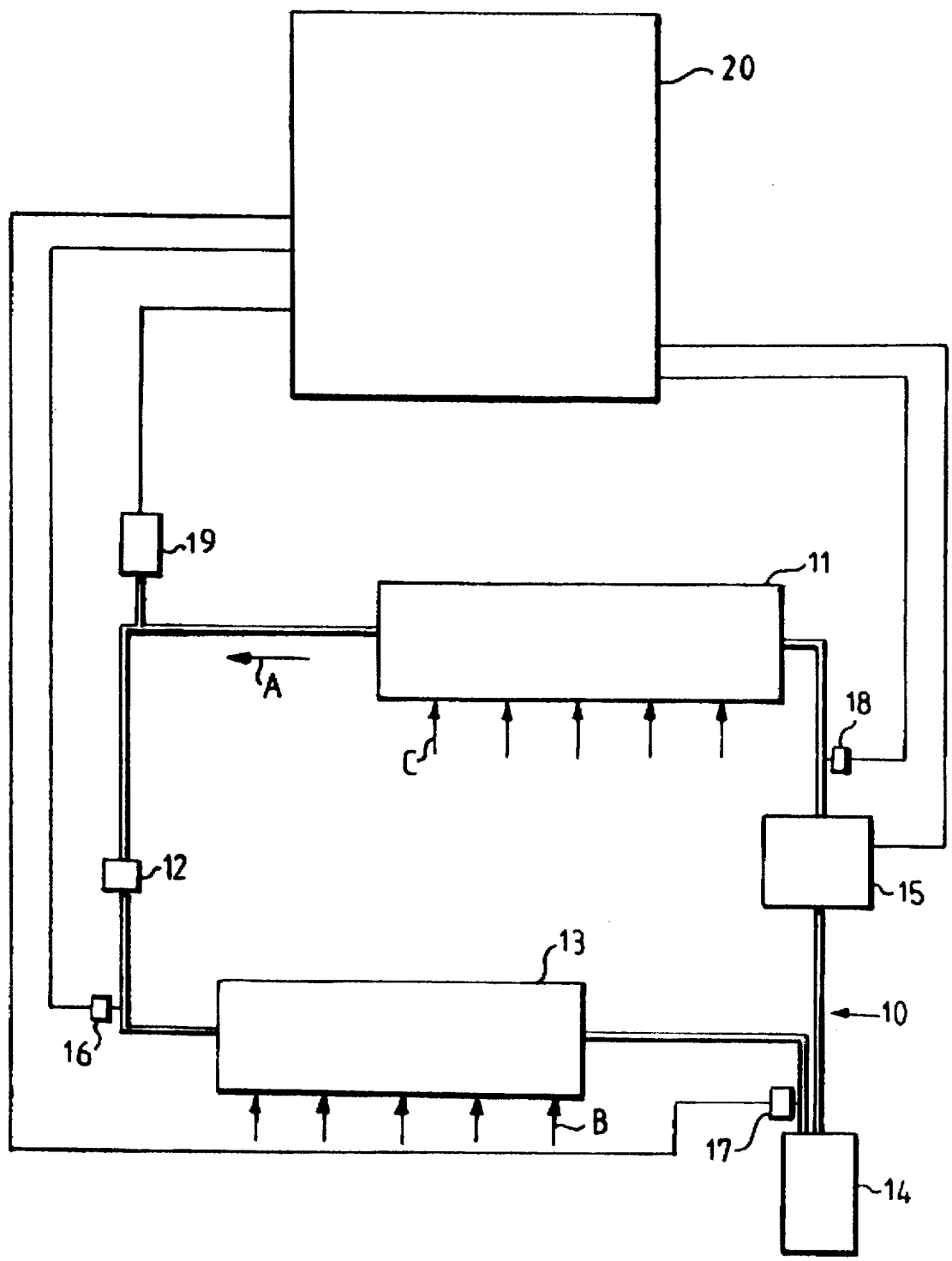

United States Patent [19]
Jonsson et al.

[11] Patent Number: 5,724,822
[45] Date of Patent: Mar. 10, 1998

[54] DETERMINING THE AMOUNT OF WORKING FLUID IN A REFRIGERATION OR HEAT PUMP SYSTEM

[75] Inventors: Nils Gustaf Hjalmar Williamsson Jonsson, Täby; Mats Hugo Rolf Dahlgren, Stocksund; Eric Gustav Granryd, Täby, all of Sweden

[73] Assignee: Nira Automotive AB, Enebyberg, Sweden

[21] Appl. No.: 481,252

[22] PCT Filed: Dec. 30, 1992

[86] PCT No.: PCT/SE92/00900
§ 371 Date: Jun. 26, 1995
§ 102(e) Date: Jun. 26, 1995

[87] PCT Pub. No.: WO94/16273
PCT Pub. Date: Jul. 21, 1994

[30] Foreign Application Priority Data

Jul. 3, 1991 [SE] Sweden .................. 91 02077

[51] Int. Cl.$^6$ .................. F25B 49/02
[52] U.S. Cl. .................. 62/129
[58] Field of Search .................. 62/125, 126, 127, 62/129, 115

[56] References Cited

U.S. PATENT DOCUMENTS

| | | |
|---|---|---|
| 3,729,949 | 5/1973 | Talbot .................. 62/149 |
| 4,220,010 | 9/1980 | Mueller et al. .................. 62/126 |
| 4,265,091 | 5/1981 | Kobayashi .................. 62/129 X |
| 5,009,074 | 4/1991 | Goubeaux et al. .................. 62/115 |
| 5,009,076 | 4/1991 | Winslow .................. 62/129 |
| 5,150,584 | 9/1992 | Tomasov et al. .................. 62/126 X |
| 5,152,152 | 10/1992 | Brickner et al. .................. 62/126 |
| 5,241,833 | 9/1993 | Ohkoshi .................. 62/129 X |

*Primary Examiner*—Harry B. Tanner
*Attorney, Agent, or Firm*—Browdy and Neimark

[57] ABSTRACT

In a compressor-operated refrigeration or heat pump system (10), the existing values of at least two variable quantities, consisting of the temperature or the pressure at different preselected places (16, 17, 18, 19) in the system (10), are sensed. The sensed values of said quantities or at least one value of at least one other variable quantity, derived from said sensed values, being utilized for determining the existing amount of working fluid in the system (10) based upon a previously established relationship between said amount and the value or values, respecitvely, of the utilized quantity or quantities. At least two different preliminary approximate values of the amount of working fluid are determined while utilizing values of at least partially different variable quantities, whereupon a resultant approximate value is determined based upon said preliminary values.

18 Claims, 2 Drawing Sheets

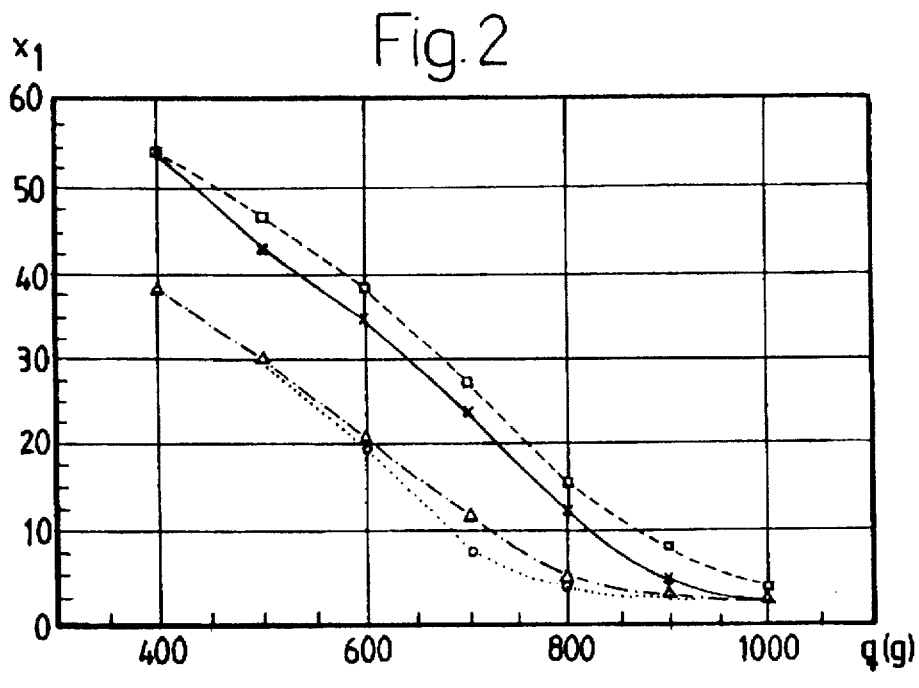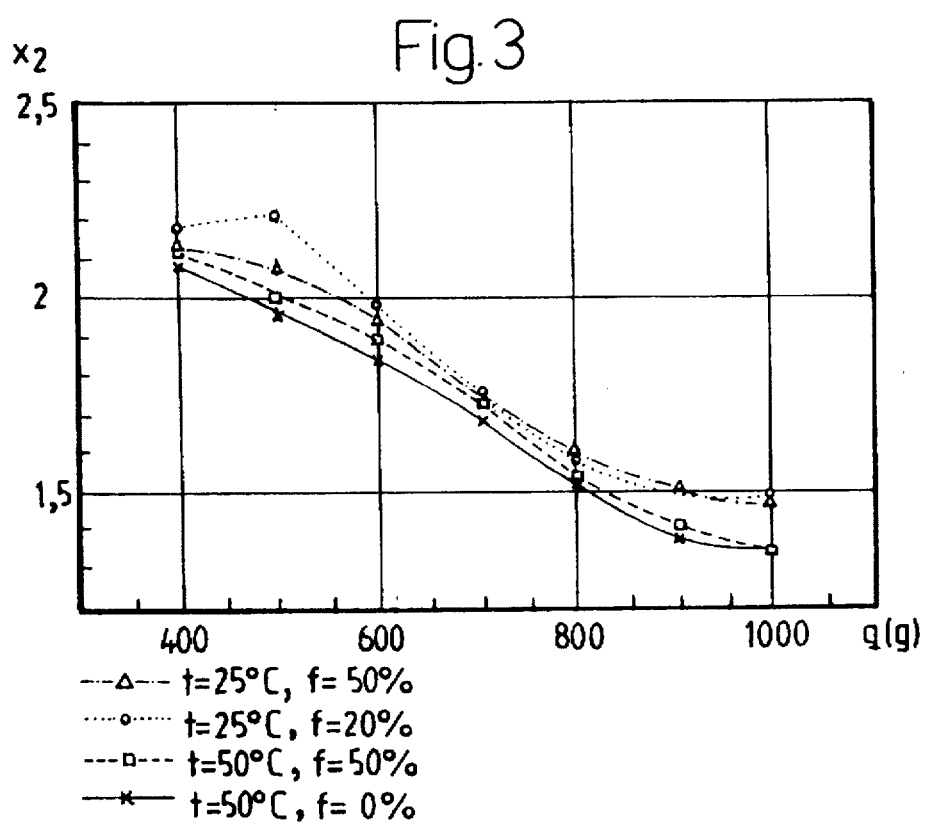

DETERMINING THE AMOUNT OF WORKING FLUID IN A REFRIGERATION OR HEAT PUMP SYSTEM

The present invention relates to the determination of the amount of working fluid in a compressor-operated refrigeration or heat pump system.

More particularly, the invention relates to a method for determining the existing amount of working fluid in a compressor-operated refrigeration or heat pump system, in which method the existing values of at least two variable quantities, consisting of the temperature or the pressure at different preselected places in the system, are sensed at a moment when the system is in operation and the sensed values of said quantities or at least one value of at least one other variable quantity, derived from said sensed values, are/is utilized for determining an approximate value of the magnitude of the amount of working fluid based upon a previously established relationship between the magnitude of the existing amount of working fluid in the system and the value or values, respectively, of the utilized quantity or quantities.

A method of the above kind is previously known through U.S. Pat. No. 5,009,076. However, a disadvantage of this known method is the inaccuracy in the possible determination of the amount of working fluid in the system.

The invention therefore has for its object to provide an improved method of the kind above defined, which makes it possible to achieve a substantially increased accuracy in the determination of the existing amount of working fluid in the system.

For this purpose, the method proposed according to the invention is primarily characterized in that at least two different preliminary approximate values of the magnitude of the amount of working fluid are determined while utilizing values of at least partially different variable quantities and that a resultant approximate value is then determined based upon said preliminary values.

Preferably, one of the preliminary values may be selected as the resultant value. In this case, different preliminary values may be selected as the resultant value within different regions for the magnitude of one of the preliminary values.

Alternatively, the resultant value may be determined through a weighting procedure in which different weights are assigned to the preliminary values.

A still further increased accuracy in the determination of the magnitude of the amount of working fluid may be obtained if each preliminary approximate value is determined based upon a relationship between the magnitude of the amount of working fluid and the value or values, respectively, of the utilized quantity or quantities, selected in view of the existing conditions of at least one of the two external media. By way of example, one condition of an external medium which may deserve to be taken into account when selecting said relationship, may be the temperature of said medium. Another possible condition is the moisture content of the medium. If the external medium consists of a flowing medium, said relationship should also be selected in view of the existing flow rate of said medium.

The invention also relates to an arrangement for determining the existing amount of working fluid in a compressor-operated refrigeration or heat pump system.

Below the invention will be further described with reference to the accompanying drawings, in which:

FIG. 1 shows a refrigeration system for use in an air-conditioning plant of a car and an arrangement according to the invention for determining the existing amount of working fluid in said system, while FIGS. 2 and 3 are diagrams showing curves which illustrate experimentally measured relationships between the amount of working fluid in said refrigeration system and different variable quantities, depending thereon, which may be utilized in the arrangement according to the invention.

The refrigeration system shown in FIG. 1 and generally designated 10 is designed as a closed system which contains a condenser 11, a fixed restriction 12, formed by a capillary tube, an evaporator 13, a liquid separator 14 and a compressor 15. The system contains a working fluid which, when the system is in operation, circulates therethrough in the direction, indicated by means of arrow A in FIG. 1, during alternating evaporation and condensation thereof.

More particularly, the working fluid is fed in a liquid state to evaporator 13 in which it is evaporated and also superheated to some degree. The superheated vapour delivered from evaporator 13 is fed to compressor 15 via liquid separator 14, in which any liquid drops contained in the working fluid flow from the evaporator are separated. In compressor 15, the intake vapour from liquid separator 14 is compressed so as to assume an increased pressure and an increased temperature before being fed to condenser 11. In condenser 11, the incoming vaporized working fluid is condensed to a liquid state. Under certain conditions, the working fluid may also be subcooled to some degree, which means that the working fluid discharged in a liquid state from condenser 11 will have a temperature below the saturation temperature corresponding to the pressure within the condenser. From condenser 11, the liquid working fluid is fed back to evaporator 13 via restriction 12 which lowers the pressure and temperature of the working fluid.

The refrigeration system 10 above described may for instance form part of an air conditioning plant in a car. In this case, fresh air to be supplied to the passenger room in the car will flow through evaporator 13 in the manner indicated by arrows B in FIG. 1. This air forms a first external medium which, in evaporator 13, is cooled through heat exchange with the working fluid circulating through refrigeration system 10 while delivering the required heat to the working fluid to evaporate and superheat the latter.

A second external medium, which also consists of fresh air, is fed through condenser 11 in the manner indicated by arrows C in FIG. 1 in order to cool the condenser and hereby bring about the desired condensation and subcooling of the working fluid fed to the condenser in a vaporized state.

In addition to refrigeration system 10, FIG. 1 also shows an arrangement according to an embodiment of the invention, selected by way of example, which serves to make it possible to determine the existing amount of working fluid in the refrigeration system. Said arrangement comprises three temperature transducers 16, 17 and 18, a pressure transducer 19, and a data processor 20.

The temperature transducer 16 is mounted in refrigeration system 10 at a place located after restriction 12 but before evaporator 13, as seen in the flow direction of the working fluid indicated by arrow A, while temperature transducer 17 is mounted at a portion of the refrigeration system located between evaporator 13 and liquid separator 14, and temperature transducer 18 is mounted at a place between compressor 15 and condenser 11. Finally, pressure transducer 19 is connected to system 10 after condenser 11 and before restriction 12. All transducers 16 to 19 are arranged to provide the data processor 20 with electric signals corresponding to the existing values of the temperature and pressure quantities of the refrigeration system sensed by them.

In the illustrated embodiment, data processor 20 is assumed to be arranged in such a manner that, at any desired moment when refrigeration system 10 is in operation, from the electric signals generated by transducers 16 to 19, it will derive values of two other variable quantities $x_1$ and $x_2$, corresponding to the existing values of the temperature and pressure quantities sensed by the transducers. The first one of said quantities may be expressed as $$x_1 = t_{17} - t_{16},$$

where $t_{17}$ is the temperature of the working fluid at the outlet side of evaporator 13 sensed by transducer 17, while $t_{16}$ is the temperature of the working fluid at the inlet side of evaporator 13 sensed by transducer 16. The second one of said two quantities may be expressed as $$x_2 = \frac{t_{18} - t_{16}}{t_{19} - t_{16}},$$

where $t_{18}$ is the temperature at the outlet side of the compressor sensed by transducer 18 and $t_{19}$ is a value of the condensing temperature within condenser 11 calculated in processor 20 based upon the pressure at the outlet side of condenser 11 sensed by transducer 19, while, as before, $t_{16}$ is the temperature at the inlet side of evaporator 13 sensed by transducer 16.

The values of quantities $x_1$ and $x_2$ derived from the transducer signals are utilized for determining two different preliminary approximate values of the existing amount of working fluid in refrigeration system 10. In processor 20 these values may be determined based upon stored information about previously established relationships between the magnitude of the amount of working fluid and the values of the quantities $x_1$ and $x_2$, respectively.

In the diagram of FIG. 2, four different curves have been shown which illustrate relationships between the amount q of working fluid and the value of quantity $x_1$ obtained through experimental measurements on a refrigeration system of the kind described for different values of the temperature t and the relative humidity f of the fresh air current B before passing through evaporator 13. In a similar manner, the diagram of FIG. 3 shows four curves which illustrate experimentally measured relationships between the amount q of working fluid and the value of quantity $x_2$ for different values of the temperature t and the relative humidity f of the fresh air current B. The two diagrams show that the relationships between the amount q of working fluid and quantities $x_1$ and $x_2$, respectively, vary with the temperature t and the humidity f.

For each quantity $x_1$ and $x_2$, respectively, the established relationship between the magnitude of the amount of working fluid and the value of the quantity in question, stored in processor 20, may constitute a suitable approximation of several different relationships of the kind shown in FIGS. 2 and 3, respectively, measured for different values of the temperature and the humidity of air current B. However, an improved accuracy in the determination of the two different preliminary values of the magnitude of the amount of working fluid effected in processor 20 may be obtained if two or more previously established relationships for each quantity $x_1$ and $x_2$, respectively, applicable e.g. to different intervals for the temperature of air current B, are stored in the processor. By means of a signal from a transducer, not shown, which senses said temperature, processor 20 may then be brought to determine the preliminary values of the magnitude of the amount of working fluid based upon the relationship applicable to the present temperature interval.

When processor 20 has effected the above-described determination of the two preliminary approximate values of the magnitude of the amount of working fluid while utilizing respective ones of the two quantities $x_1$ and $x_2$, it determines a resultant approximate value of the magnitude of the amount of working fluid based upon said preliminary values.

The resultant value may be determined in several different ways. For instance, processor 20 may be arranged to select one of the two preliminary values as the resultant value, in which case different preliminary values may be selected as the resultant value within different intervals for the magnitude of one of the preliminary values.

Alternatively, the resultant value may be determined through a weighting procedure in which different weights are assigned to the preliminary values.

From processor 20, the resultant value determined therein may be fed to an indicator of any suitable kind, not shown.

The invention is not restricted to the embodiment above described and illustrated in the drawings. Instead, many other embodiments are feasible within the scope of the invention. By way of example, it could be mentioned that temperature transducer 16 may be replaced by a pressure transducer which may be placed immediately before or, preferably, immediately behind evaporator 13 and that pressure transducer 19 may be replaced by a temperature transducer placed immediately behind condenser 11 or by a pressure transducer placed immediately behind compressor 15.

We claim:

1. A method for determining the existing amount of working fluid in a compressor-operated refrigeration or heat pump system, said method comprising:

sensing the existing values of at least two variable quantities ($t_{16}$, $t_{17}$, $t_{18}$, $p_{19}$), consisting of the temperature or pressure of the working fluid at different preselected places in the system, at a moment when the system is in operation;

utilizing the sensed values of said quantities or at least one value of at least one other quantity ($x_1$, $x_2$), derived from said sensed values, for determining an approximate value of the magnitude of the existing amount of working fluid in the system based upon a previously established relationship between the magnitude of the existing amount of working fluid in the system and the value or values, respectively, of the utilized quantity or quantities ($t_{16}$, $t_{17}$, $t_{18}$, $p_{19}$, $x_1$ $x_2$);

characterized by the steps of:

determining at least two different preliminary approximate values of the magnitude of the existing amount of working fluid in the system while utilizing values of at least partially different variable quantities; and determining a resultant approximate value based upon said preliminary values.

2. A method according to claim 1, characterized in that one of the preliminary values is selected as the resultant value.

3. A method according to claim 2, characterized in that different preliminary values are selected as the resultant value within different regions for the magnitude of one of the preliminary values.

4. A method according to claim 3, characterized in that each preliminary approximate value is determined based upon a relationship between the magnitude of the amount of working fluid and the value or values, respectively, of the utilized quantity or quantities, selected in view of the existing conditions of at least one of the two external media.

5. A method according to claim 2, characterized in that each preliminary approximate value is determined based upon a relationship between the magnitude of the amount of working fluid and the value or values, respectively, of the utilized quantity or quantities, selected in view of the existing conditions of at least one of the two external media.

6. A method according to claim 1, characterized in that each preliminary approximate value is determined based upon a relationship between the magnitude of the amount of working fluid and the value or values, respectively, of the utilized quantity or quantities, selected in view of the existing conditions of at least one external medium.

7. An apparatus arrangement for determining the existing amount of working fluid in a compressor-operated refrigeration or heat pump system, said apparatus comprising:

means for sensing the existing values of at least two variable quantities ($t_{16}$, $t_{17}$, $t_{18}$, $p_{19}$), consisting of the temperature or pressure of the working fluid at different preselected places in the system, at a moment when the system is in operation;

means for utilizing the sensed values of said quantities or at least one value of at least one other quantity ($x_1$, $x_2$), derived from said sensed values, for determining an approximate value of the magnitude of the existing amount of working fluid in the system based upon a previously established relationship between the magnitude of the existing amount of working fluid in the system and the value or values, respectively, of the utilized quantity or quantities ($t_{16}$, $t_{17}$, $t_{18}$, $p_{19}$, $x_1$ $x_2$); said means for utilizing including:

first means, for determining at least two different preliminary approximate values of the magnitude of the existing amount of working fluid in the system while utilizing values of at least partially different variable quantities; and second means, for determining a resultant approximate value based upon said preliminary values.

8. An arrangement according to claim 7, characterized in that it is adapted to determine each preliminary approximate value based upon a relationship between the magnitude of the amount of working fluid and the value or values, respectively, of the utilized quantity or quantities, selected in view of the existing conditions of at least one external medium.

9. An arrangement according to claim 7, characterized in that it is adapted to select one of the preliminary values as the resultant value.

10. An arrangement according to claim 9, characterized in that it is adapted to select different preliminary values as the resultant value within different regions for the magnitude of one of the preliminary values.

11. An apparatus according to claim 10, comprising means for determining each preliminary approximate value based upon a relationship between the magnitude of the amount of working fluid and the value or values, respectively, of the utilized quantity or quantities, selected in view of the existing conditions of at least one of the two external media.

12. An apparatus according to claim 9, comprising means for determining each preliminary approximate value based upon a relationship between the magnitude of the amount of working fluid and the value or values, respectively, of the utilized quantity or quantities, selected in view of the existing conditions of at least one of the two external media.

13. A method for determining the existing amount of working fluid in a compressor-operated refrigeration or heat pump system, said method comprising:

sensing, at different preselected places in the system and at a moment when the system is in operation, at least two measured values of at least one variable quantity comprising at least one of working-fluid temperature and working-fluid pressure;

deriving at least two derived quantities from the measured values;

determining at least two different preliminary estimated amounts of the working fluid in the system by utilizing a respective previously-established relationship between each of the derived quantities and an actual amount of working fluid in the system; and arriving at a resultant final estimated amount based upon said preliminary estimated amounts.

14. The method according to claim 13, wherein the previously-established relationship includes a look-up table and wherein in the step of determining, both of the two different preliminary estimated amounts is determined in reference to the look-up table.

15. The method according to claim 14, comprising a step of measuring an ambient air temperature, and wherein the look-up table is specific to the measured air temperature.

16. An apparatus for determining the existing amount of working fluid in a compressor-operated refrigeration or heat pump system, said apparatus comprising:

means for sensing, at different preselected places in the system and at a moment when the system is in operation, at least two measured values of at least one variable quantity comprising at least one of working-fluid temperature and working-fluid pressure;

means for deriving at least two derived quantities from the measured values;

means for determining at least two different preliminary estimated amounts of the working fluid in the system by utilizing a respective previously-established relationship between each of the derived quantities and an actual amount of working fluid in the system; and means for arriving at a resultant final estimated amount based upon said preliminary estimated amounts.

17. The apparatus according to claim 16, wherein the previously-established relationship includes a look-up table and wherein the means for determining at least two different preliminary estimated amounts includes means for determining both of the two different preliminary estimated amounts in reference to the look-up table.

18. The apparatus according to claim 17, comprising means for measuring an ambient air temperature, and wherein the look-up table is specific to the measured air temperature.

* * * * *